No. 638,132.　　　　　　　　　　　　　　　　Patented Nov. 28, 1899.
A. MARX.
WATER BICYCLE OR VELOCIPEDE.
(Application filed Dec. 3, 1898.)

(No Model.)

Witnesses:
E. K. Bolton

Inventor:
Andreas Marx
By Richards & Co.
his Attorneys.

UNITED STATES PATENT OFFICE.

ANDREAS MARX, OF FUERSTENBERG, GERMANY.

WATER BICYCLE OR VELOCIPEDE.

SPECIFICATION forming part of Letters Patent No. 638,132, dated November 28, 1899.

Application filed December 3, 1898. Serial No. 698,189. (No model.)

*To all whom it may concern:*

Be it known that I, ANDREAS MARX, a citizen of the Kingdom of Prussia, and a resident of Fuerstenberg, in the Grand Duchy of Mecklenburg and German Empire, have invented certain new and useful Improvements in Water Bicycles or Velocipedes, (for which I have obtained a patent in Great Britain, dated May 18, 1898, No. 11,366; in France, dated May 16, 1898, No. 277,998; in Belgium, dated May 23, 1898, No. 135,778; in Austria, dated May 14, 1898, No. 48/4,129; in Hungary, dated May 25, 1898, and in Germany, dated May 7, 1898, Gebrauchsmuster, No. 100,595,) of which the following is a specification.

This invention relates to water bicycles or velocipedes of the class actuated by pedals, such as are common in wheels which are set in motion directly from the seat of the rider; and it consists in the improvements and additions set forth in the specification hereunto annexed.

In water-bicycles great difficulty was experienced in making the propeller immediately respond to the action of the pedals. The slowness in locomotion and the insecurity resulting therefrom rendered this class of sports a very dangerous one, a further danger in the use of such bicycles arising from the inability of the rider to work his pedals immediately on mounting the bicycle, owing to the necessity of first turning the pedals until they had assumed the right angle most convenient for working them. Great danger of capsizing was the result of these deficient constructions. In my invention these serious obstacles to the use of water-bicycles are overcome by the peculiar construction of wheels and a securing device responding to the action of a spring, as will be more fully set forth farther on.

Figure 1:
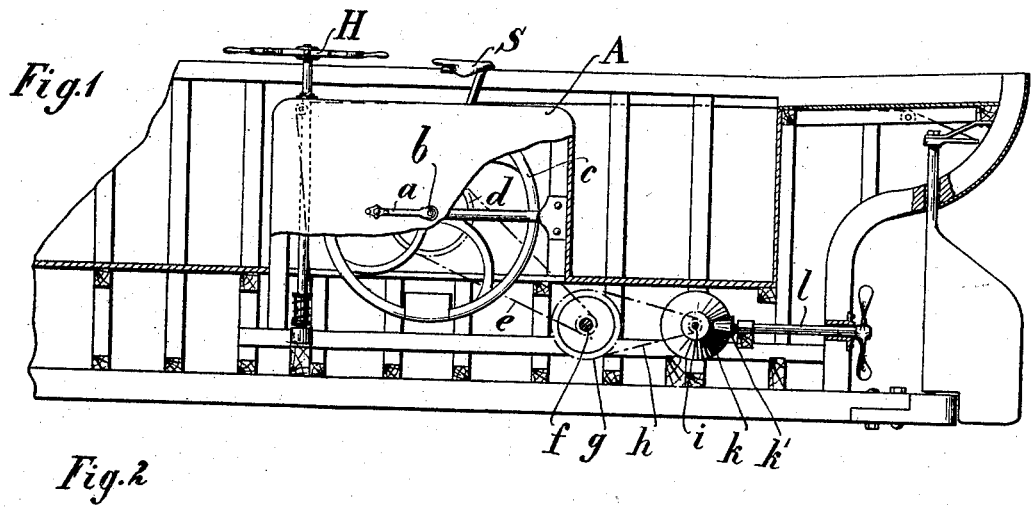
Figure 2:
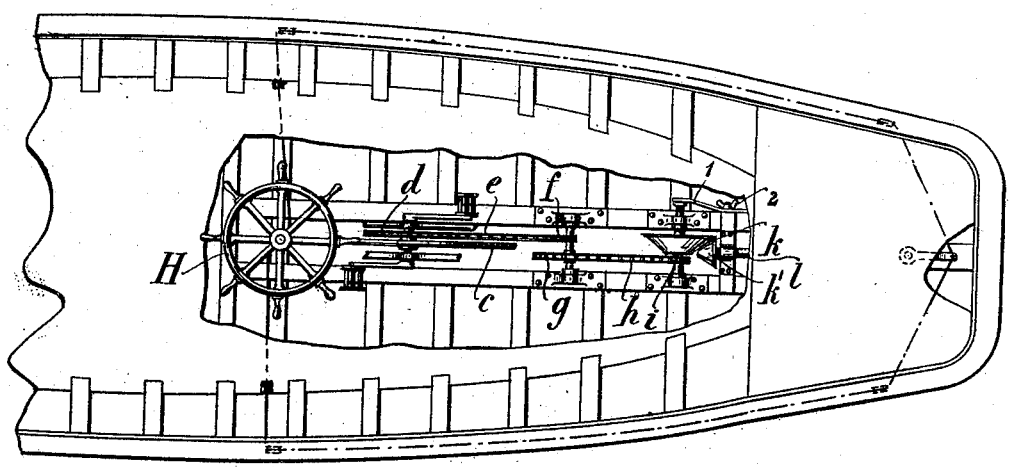
Figure 3:
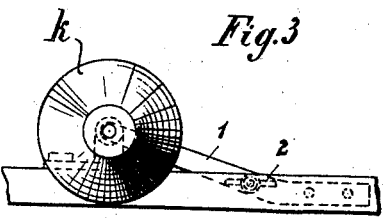
Figure 4:
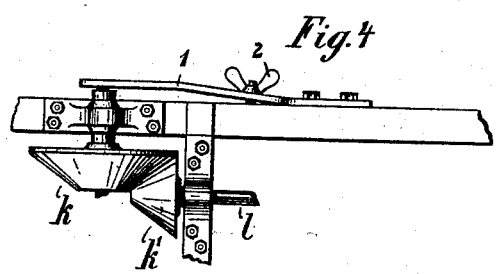

In the drawings, Figure 1 is a longitudinal section, with some parts in elevation, of a boat embodying my invention. Fig. 2 is a plan view, parts of the bottom being broken away. Figs. 3 and 4 show the spring-actuated securing device for the propeller in detail and upon an enlarged scale.

In the middle part of the boat a box A is provided suitable for covering the whole or only part of the driving mechanism. The box A is surmounted by the saddle S, of which there may be any desired number in case the bicycle is intended for the accommodation of two or more persons at a time in the manner of tandems used for locomotion on land. The box is further surmounted by steering-wheel H, which is in ready reach of the rider and upon which the rider may lean, as upon the handle-bar of a bicycle. The shaft of this wheel terminates in a sleeve situated in the bottom part of the boat, said sleeve being provided with two cords of steel wire or other suitable material, which are so arranged that one is unrolled while the other is wound up. The sleeve is further connected by cords or suitable gearing with the actual steering-gear in the rear part of the boat, causing it to respond to the motion of the wheel or handle-bar H.

Motion is imparted to the vehicle by the action of the chain-wheel $d$, actuated by the shaft $b$, bearing the pedals $a$, the construction of which is that commonly known for bicycles. Upon the same shaft $b$ is secured the fly-wheel $c$, which by a distribution of weights upon its surface or circumference will when at rest always assume the same relative position to the saddle, thereby keeping the pedals $a$ always in one and the same position when not in use, so that upon mounting the bicycle the position of the pedals is ready for immediate action. A chain $e$ transmits the rotary motion of the chain-wheel $d$ upon the smaller chain-wheel $f$, which by means of a chain $h$ or by suitable gearing further actuates the sprocket-wheel $i$ and bevel-wheels $k$ and $k'$, which rotate the shaft $l$ of the propeller. The use of this gearing effects the rotation of the propeller with but a minimum of force being applied by the rider.

In order to secure the ready action of the gearing and to keep the bevel-wheels $k$ and $k'$ always in connection, a flat spring 1, Fig. 3, is provided, which bearing upon its free end a cam 3, fitting into a recess of the shaft of the wheel $k$, serves to press the conical wheel $k$ into gearing with the wheel $k'$, a screw 2 being provided for tightening the flat spring 1 and taking up the slack dependent upon the motion of the various parts. This arrangement also permits of reversing the motion of the bicycle.

In order to reduce friction, ball-joints are used for the connection of the various parts.

What I claim, and desire to secure by Letters Patent of the United States, is—

In combination, the frame, the pedals and fly-wheel, the screw-propeller having a friction-cone $k'$ thereon, a second cone engaging the first, a shaft carrying the second cone journaled in the frame, and movable longitudinally, means for driving the second cone from the fly-wheel and means for keeping the cones in engagement and allowing the reversal of the movement consisting of the leaf-spring bearing against the end of the shaft and means for adjusting the leaf-spring, substantially as described.

In testimony whereof I affix my signature in presence of two witnesses.

ANDREAS MARX.

Witnesses:
 W. HAUPT,
 HENRY HASPER.